(12) United States Patent
Standaar et al.

(10) Patent No.: US 12,342,956 B2
(45) Date of Patent: Jul. 1, 2025

(54) FOAMING DEVICE, APPARATUS AND METHOD THEREFOR

(71) Applicant: Koninklijke Douwe Egberts B.V., Utrecht (NL)

(72) Inventors: Koen Standaar, Utrecht (NL); Hendrik Johan Dees, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 555 days.

(21) Appl. No.: 17/263,371

(22) PCT Filed: Jul. 19, 2019

(86) PCT No.: PCT/EP2019/069532
§ 371 (c)(1),
(2) Date: Jan. 26, 2021

(87) PCT Pub. No.: WO2020/020781
PCT Pub. Date: Jan. 30, 2020

(65) Prior Publication Data
US 2021/0282586 A1  Sep. 16, 2021

(30) Foreign Application Priority Data

Jul. 27, 2018 (GB) ..................................... 1812279

(51) Int. Cl.
*A47J 31/44* (2006.01)
*A47J 31/60* (2006.01)
(Continued)

(52) U.S. Cl.
CPC ........... *A47J 31/4496* (2013.01); *A47J 31/60* (2013.01); *B01F 23/232* (2022.01);
(Continued)

(58) Field of Classification Search
CPC .. A47J 31/4496; B01F 25/4231; B01F 23/232
See application file for complete search history.

(56) References Cited

U.S. PATENT DOCUMENTS 2,508,528 A * 5/1950 McPherson ............ B01D 19/02
55/440
2008/0066623 A1* 3/2008 Noordhuis .......... A47J 31/0678
426/77
(Continued)

FOREIGN PATENT DOCUMENTS

CN 105559586 A 5/2016
EP 2042063 A1 4/2009
(Continued)

OTHER PUBLICATIONS

Translation of WO-2008049854-A1 (Year: 2008).*
(Continued)

*Primary Examiner* — Elizabeth M Kerr
(74) *Attorney, Agent, or Firm* — Fitch, Even, Tabin & Flannery LLP

(57) ABSTRACT

A foaming device comprising a fluid inlet, a fluid outlet spaced apart from said fluid inlet and a fluid conduit extending from said fluid inlet to said fluid outlet, the fluid conduit defining a cavity characterised in that said fluid conduit comprises first and second plates at least one of which comprises a plurality of baffles projecting into the cavity of the fluid conduit, and wherein at least one plate is movable with respect to the other to vary the distance between said plates.

24 Claims, 10 Drawing Sheets

(51) Int. Cl.
    *B01F 23/232*     (2022.01)
    *B01F 23/235*     (2022.01)
    *B01F 25/421*     (2022.01)
    *B01F 35/10*     (2022.01)
    *B01F 101/14*     (2022.01)

(52) U.S. Cl.
    CPC ........ *B01F 23/235* (2022.01); *B01F 25/4231* (2022.01); *B01F 35/1452* (2022.01); *B01F 2101/14* (2022.01)

(56) References Cited

U.S. PATENT DOCUMENTS

2016/0367071 A1*   12/2016   Dollner ........... B01F 35/221422
2020/0030825 A1*   1/2020   Otoguro ................ B01F 25/431

FOREIGN PATENT DOCUMENTS

| GB | 891152 A | 3/1962 | |
| WO | 2008049854 | 5/2008 | |
| WO | WO-2008049854 A1 * | 5/2008 | ......... B05B 11/3087 |

OTHER PUBLICATIONS

Communication pursuant to Article 94(3) EPC dated May 3, 2023, European Application No. 19742365.0 (3 pgs.).
Search Report dated Jan. 17, 2019, for GB Application No. 1812279.6 (4 pgs.).
International Search Report and Written Opinion, mailed Oct. 7, 2019, for International Application No. PCT/EP2019/069532 (8 pgs.).

* cited by examiner

FOAMING DEVICE, APPARATUS AND METHOD THEREFOR

CROSS REFERENCE TO RELATED APPLICATIONS

This application is a U.S. national phase application of International Application No. PCT/EP2019/069532, filed Jul. 19, 2019, which claims benefit from GB Application 1812279.6, filed Jul. 27, 2018, which are each hereby incorporated herein by reference in their entirety.

TECHNICAL FIELD OF THE INVENTION

The present invention relates to foaming devices and beverage preparation apparatus comprising a foaming device. Furthermore, the invention relates to methods of foaming a liquid.

BACKGROUND TO THE INVENTION

It is well known to the skilled person in the field of coffee brewing that coffee beverage preparations which do not involve use of high pressure to perform the beverage extraction do not generate a layer of fine foam (so called crema) on top of the preparations themselves.

A high-quality crema for a coffee preparation is characterised by a small bubble size and a uniform bubble size distribution.

When coffee beverage preparations are carried out at low or atmospheric pressure, in order to obtain a high-quality crema layer it is necessary to make use of additional tools or devices integrated to or external to the beverage preparation machines. In such tools or devices foam generation is performed on the coffee brew coming out from the extraction or preparation unit, before reaching the cup for consumption.

These known tools are generally called "foamers" and use several mechanisms to foam the beverage and deliver a preparation which has a layer of crema on the beverage top surface.

The layer of crema improves the appeal of the coffee beverage, resulting in a better experience for consumers and a higher customer satisfaction.

In some foamers of the prior art, foam is generated by forcing a beverage preparation (or alternatively any food beverage) to pass through an orifice of reduced dimensions together with a gas (commonly air). This orifice is called a restrictor. The passage of beverage through the restrictor, combined with gas mixing, results in the generation of a fine foam exiting the restriction. In beverage preparation machines, such as for instance a coffee machine, said restrictors are usually positioned along the beverage fluid flow path and after the extraction chamber.

These known foamers have the disadvantage of being costly and suffer from manufacturing difficulties, due to the very small dimensions of these orifices. Furthermore, the fluid flow rate of the beverage preparation passing through the orifices needs to be high to create the necessary drop in pressure across the orifices themselves. In addition, these small orifices can easily clog due to dried residue of beverage, generating malfunctions in the foamer.

In alternative foamers of the prior art, liquid and gas (such as a food beverage and air) are sent through a tube of defined length and width, filled with beads of selected diameters which form a turbulent fluid path, allowing air to be incorporated into the beverage and dissolved in it.

Similarly to the foamers provided with restrictors, the production costs for these known bead-in-tube foamers is very high, due to the necessity of producing a tube with reduced dimension in which small beads must be loaded.

In addition, the interiors of these bead-in-tube foamers are not easy to access for cleaning, leading to hygiene issues and potential cross-contamination between two consecutive beverage preparations.

It would be therefore advantageous to provide a solution which would mimic the behaviour of the known foamers, but provide easy cleaning, preferably through the device being openable for inspection and cleaning.

It would be furthermore advantageous to provide a solution which would overcome hygiene issues and cross-contamination between two consecutive uses or preparations.

In addition, it would be advantageous to provide a solution which would ensure a low-cost route to manufacturing, by converting a complex tube structure to a simplified structure which allows ease of manufacture and assembly.

Finally, it would be advantageous to provide a solution suitable for several beverage preparations comprising coffee, milk, chocolate, tea preparations and/or soups, broths or other food beverages, or the like.

It is therefore an aim of embodiments of the invention to mitigate or overcome at least one problem of the prior art.

SUMMARY OF THE INVENTION

According to a first aspect of the invention there is provided a foaming device comprising: a fluid inlet, a fluid outlet spaced apart from said fluid inlet and a fluid conduit extending from said fluid inlet to said fluid outlet, the fluid conduit defining a cavity, characterised in that said fluid conduit comprises first and second plates at least one of which comprises a plurality of baffles projecting into the cavity of the fluid conduit, and wherein at least one plate is movable with respect to the other to vary the distance between the plates.

In a preferred embodiment, the foaming device may comprise a beverage foaming device.

In some embodiments, only one of the plates may be movable with respect to the other to vary a distance between the two plates. In other embodiments, the first plate and second plate may be both movable.

In preferred embodiments, first plate and second plate may be detachably connected. In addition, the first and second plates may comprise a first and second plate holders respectively. The first and second plate holders may be removably connected to each other through a connection means. Preferably the connection means may comprise external connection means and/or connection means which are integral with the plate holders.

In some embodiments, the external connection means may comprise a casing surrounding said first and second plate holder. More preferably this casing can be a resilient casing such as a rubber and/or silicone casing. In other preferred embodiments, the resilient casing may comprise a sleeve, such as a rubber and/or silicone sleeve.

In some other embodiments, the casing may comprise a metal and/or a plastics casing. The plastic substrate casing may comprise polylactic acid (PLA), polyethylene (PE), polyethylene terephthalate (PET), polypropylene (PP), polyamide (PA), polycarbonate (PC) and/or a combination thereof.

In other embodiments, said connection means within said plate holders may comprise clamping, snap-on, dowel pins, flanged, edged, threaded and/or bayonetted connections.

In further embodiments, said first and second plate holders may be fixedly connected to the first and second plate.

In other embodiments, the first and second plate holders can be integral with said first and second plate respectively. In such embodiments, the first and second plate may be considered a surface of the plate holder, from which said baffles protrude. The first and second plates and baffles may be integral with said first and second plate holders and each may be moulded in a unitary body.

In some embodiments, said first and second plate holders are removably connected to said first and second plate. Preferably said first and second plate holders comprise connection means in order to connect to said first and second plate; more preferably the connection means may comprise clamping, snap-on, dowel pins, flanged, edged, threaded and/or bayonetted connections.

In some embodiments the first and second plate holders may comprise a seal which is arranged in use to seal the periphery of the fluid conduit defined between the first and second plate holders. Preferably the seal may comprise a resilient seal and more preferably the resilient seal may comprise a rubber and/or plastic seal, such as a gasket.

In some embodiments the seal may be located in a seal housing provided on the first and second plate holders.

Furthermore, in other embodiments, both first and second plates may comprise baffles projecting into the cavity. Preferably the baffles projecting into the cavity may comprise hemispherical, cuboid, pyramidal, conical, prismatic, cylindrical, and/or hexagonal baffles.

In other embodiments, the baffles may be integral with said plates. The baffles may comprise the same material as the first and/or second plate.

In other embodiments the baffles may be fixedly attached to said first and second plate.

In further embodiments, said baffles may be removably attached to the first and second plates. The first and second plate and the baffles may comprise a reciprocal connection means. More preferably the reciprocal connection means comprises adhesive, or clamp, bayonetted, snap-on, clamping, dowel pin and/or threaded connections.

In some embodiments, said first and second plate may comprise a material selected from a metal and/or a plastic substrate and/or a combination thereof. Furthermore, the plastic substrate may comprise polylactic acid (PLA), polyethylene PE, polyethylene terephthalate (PET), polypropylene (PP) polyamide (PA), polycarbonate (PC) and/or a combination thereof. Metal substrates may comprise stainless steel.

In alternative embodiments, said first and second plate holder may comprise different material with respect to said first and second plates.

In other embodiments, said first and second plate holder may comprise the same material as said first and second plates.

In some embodiments, the baffles may comprise the same material as said first and second plates.

In other embodiments, the baffles may comprise a different material with respect to said first and second plates.

In some embodiments, the baffles may comprise a rigid material.

In other embodiments, the baffles may comprise a resilient material. In preferred embodiments, resilient material comprises an elastomer. Preferably the elastomer may comprise a rubber or silicone.

In some embodiments, the first plate comprises baffles of rigid material and said second plate may comprise baffles of resilient material.

In some embodiments, the baffles may extend at least partially along the length of at least one plate, such as along at least a majority of the length of the plate, or the baffles may extend along the entire length of the at least one plate. Even more preferably at least a portion of said baffles on the first and second plate may not be in register (e.g. they are not aligned such that their distal ends are opposite each other, or the baffles of one plate are not entirely superposed with the baffles on the other plate, or the baffles of one plate are superposed above the gaps between baffles of the other plate).

In some embodiments, said baffles may be positioned along said first plate and/or said second plate in a repeated pattern configuration. Preferably, said repeated pattern configuration may comprise a matrix, random and/or labyrinthic configuration.

In some embodiments, the first plate and second plate may be movable with respect to each other within a range of 0.5 and 4.5 mm, preferably between 0.5 and 3 mm. In some embodiments, the plate or plates may be movable between an open configuration where the baffles on each plate do not touch or abut either or both of the opposite plate or the baffles on the opposite plate, and a closed (or operational) configuration where the baffles on at least one plate touch or abut the opposite plate or the baffles on each plate touch or abut. The plates may move between an open configuration in which the plates are between 3 mm and 10 mm apart, especially between 3 mm and 5 mm or between 3 mm and 4.5 mm apart, and a closed or operational configuration in which the baffles of one plate abut or touch the opposite plate and/or the baffles of the opposite plate. The closed configuration may comprise the plates being spaced apart by between 0.5 mm and 3 mm, for example 0.5 mm to 2 mm. It will be appreciated that the baffles will have a length which ensures that they do not touch or abut the opposite plate or baffles of the opposite plate in the open configuration, but which do in the closed configuration.

The baffles projecting from said first and/or said second plate may create a fluid flow path within said cavity of the fluid conduit. Preferably said fluid flow path within said cavity may be generated when the distance between said first plate and second plate is in the range of 0.5-3 mm. The fluid flow path creates a turbulence generating path, such that fluid flowing through the fluid conduit and along the path formed between the baffles is subjected to turbulence which aids in foaming a fluid conveyed therethrough.

The baffles may be configured such that they form a fluid flow path which changes in cross-sectional area along the path. The cross-sectional area may change along a portion of the path or along the full path formed between the baffles. The cross-sectional area of the path may include regions of larger cross-sectional area separated by regions of smaller cross-sectional area. The cross-sectional area may increase and decrease in height or width and may cycle through increasing and decreasing cross-sectional area along the path. The cross-sectional area of the path may change between 1 $mm^2$ and 65 $mm^2$, such as between 2 $mm^2$ and 20 $mm^2$ or between 3 $mm^2$ and 10 $mm^2$, for example. In some embodiments the cross-sectional area of the baffles changes along the length (height) of the baffle, such that cross-sectional area of the path between baffles also changes in area. The radial distance between the centre of each baffle may be in the range of 0.5 and 6.5 mm and/or the distance between the outer surface of each protrusion may be between 0.1 to 3.5 mm, for example. It will be appreciated that the distance between the outer surfaces of each baffle may vary based on the shape and configuration of the baffles (irrespective of whether the spacing between each baffle is constant). For example, when the baffles are dome-shaped or hemispherical, the distance between the outer surfaces of two adjacent baffles at the base of the dome or hemisphere will be less than the distances at the apex of the dome or hemisphere irrespective of whether the spacing between the baffles is substantially constant or not. In other embodiments, the baffles may have a uniform cross-section and be uniformly spaced apart, such that the distance between the outer surface of adjacent baffles is substantially constant.

It will also be appreciated that by careful configuration of both the shape of the baffles and the spacing between the baffles, fluid flow paths of differing configurations can be achieved, and such configurations may be devised to create desired foam consistency as fluid flows through the device. This is in contrast to restrictor-based foamers, which have a constant restrictor configuration, and bead-based foamers in which the final fluid flow path cannot accurately be determined in advance, due to the beads settling in random configurations within the device.

In some embodiments, the cavity may comprise the fluid flow inlet and a fluid flow outlet. Preferably fluid flow inlet may comprise two or more inlets.

In some embodiments, the fluid flow inlet may comprise a combined gas and a liquid inlet, or there may be separate gas and liquid inlets.

Preferably the gas inlet is an air, nitrogen, or carbon dioxide, nitrous oxide inlet. The liquid inlet may be a coffee extract, tea, milk, creamer, chocolate, soup, or broth inlet. The liquid inlet may comprise hot and cold beverages.

In some embodiments, the fluid flow inlet and/or outlet may comprise a fluid flow rate in the range of 1 to 50 ml/sec, such as between 2 to 40 ml/sec or preferably between 3 to 20 ml/sec. In some embodiments the fluid flow rate may be between 5 and 15 ml/sec. In consequence, the rate of fluid flow through the fluid conduit may be in the same preferred ranges.

In some embodiments, the fluid flow rate may comprise a gas to liquid flow rate ratio in the range of 1:20 to 1:1.2. In embodiments where there are two fluid flow inlets, preferably at least one of said two inlets may be oriented laterally to another.

In other embodiments, at least one of said fluid flow inlets may be parallel with another.

According to a second aspect of the invention there is provided a beverage preparation apparatus comprising a foaming device of the first aspect of the invention.

The beverage preparation apparatus may comprise a beverage machine. The beverage machine may comprise a coffee-making machine. The coffee-making machine may comprise one or more, and preferably all of: a water container, a heating device, a pressure system, ingredient storage containers, a mixing and/or an extraction chamber, a beverage outlet and a foaming device.

The water container may comprise a water reservoir. The pressure system may comprise at least one pump. The heating device may comprise a heating element. The foaming device may be positioned downstream the extraction chamber between the extraction chamber and the beverage outlet. The beverage outlet may comprise a spout.

In preferred embodiments, one of said plates may comprise a beverage container holder.

In some embodiments, one of said plates may comprise a beverage dispensing orifice.

According to a third aspect of the invention there is provided a method of foaming a liquid using the foaming device of the first aspect of the invention, including steps of:
 a) providing at least a liquid and at least a gas;
 b) conveying said liquid and gas through the fluid conduit of the device to form a foamed fluid; and
 c) collecting the foamed fluid.

In some preferred embodiments, step b) may comprise arranging the plates such that the baffles form a turbulence-generating fluid flow path in the fluid conduit, through which the liquid and gas are conveyed. Step b) may comprise moving the first and/or second plate from an open, non-operational position, to the operational position. In this way, step b) may comprise reducing the distance between the first and second plates and therefore reducing the distance between the baffles, so as to create a turbulence-generating path between the baffles.

The method may comprise foaming a beverage liquid, and step a) may comprise providing a beverage liquid selected from coffee extract, tea, creamer, milk, chocolate, soup or broth, for example. The liquid and gas may be as described hereinabove for the first aspect of the invention.

According to a fourth aspect of the invention there is provided a method of cleaning a foaming device of the first aspect of the invention, comprising the steps of:
 a) increasing the distance between the first and second plates,
 b) conveying at least one flushing or purging liquid or a gas through the fluid conduit formed between the plates.

The flushing or purging liquid may be water, for example.

DETAILED DESCRIPTION OF THE INVENTION

In order that the invention may be more clearly understood, embodiments thereof will now be described, by way of example only, with reference to the accompanying drawings of which:

Referring to the Figures, like numbers represent like components.

Figure 1:
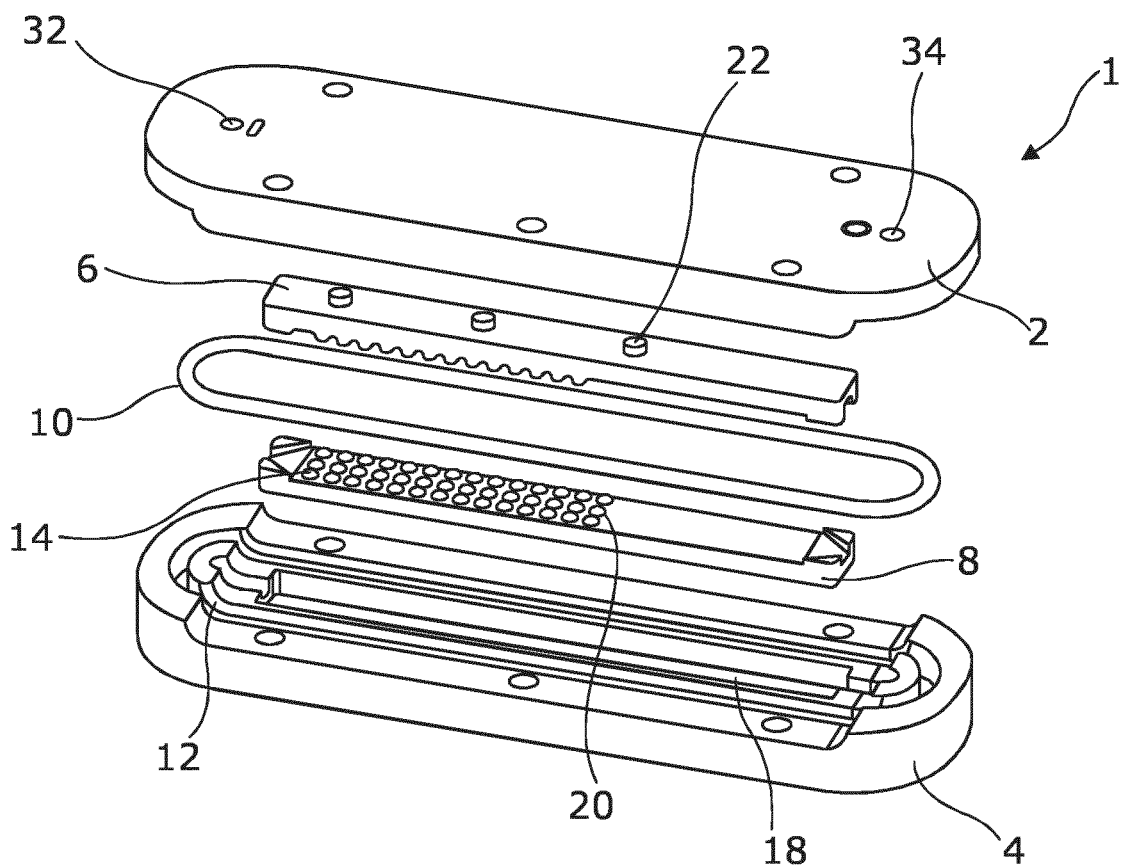
FIG. 1 illustrates a perspective exploded view of an embodiment of a foaming device of a first aspect of the invention.
Figure 2:
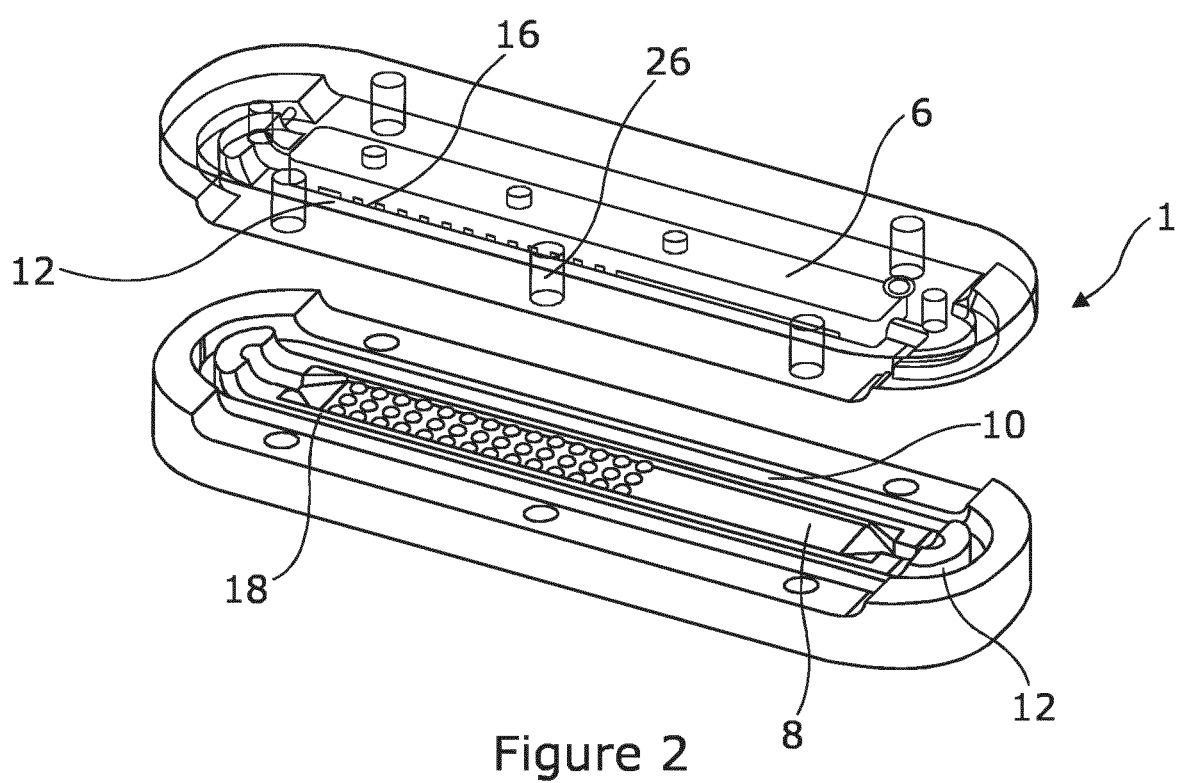
FIG. 2 illustrates a perspective view of a partially assembled foaming device of FIG. 1, according to the first aspect of the invention.

Referring firstly to FIGS. 1 and 2 an embodiment of a foaming device (1) is shown. This embodiment comprises a first plate holder (2) and a second plate holder (4) each one provided with a seal housing in the form a half-channel groove (12), cut into opposite and facing surfaces thereof. The device (1) is also provided with a seal in the form of a gasket (10) located within the channel formed between the two grooves (12) when the first plate holder (2) and second plate holder (4) are joined. A first plate (6) connected to the first plate holder (2) and a second plate (8) connected to the second plate holder (4) are arranged such that that a free surface of each face each other, each plate (6,8) being provided with baffles protruding from the free surfaces, in the form of hemispheres (14). The hemispheres (14) on each plate (6, 8) are aligned in a repeated pattern configuration (20), partially extending along the free faces of said plates (6, 8). The gasket (10) is arranged to extend around the first and second plates (6,8) thereby sealing the edges thereof and ensuring a fluid-tight channel is formed between the first and second plates (6,8). A first plate housing (not shown) and a second plate housing (18) are provided respectively in the first plate holder (2) and the second plate holder (4) to retain and align the respective plates (6, 8). Retention means in the form of a clamp/threaded connection (22) are used to secure the plates (6, 8) to said plate housings (16, 18) and the two plate holders (2, 4) to each other. A fluid flow inlet (32) and a fluid flow outlet (34) are spaced apart to each other and positioned on the same side of the first plate holder (2) across the first plate (6) and the first plate holder (2) itself.

In the embodiment of FIG. 1 the first plate (6) and the second plate (8) have a length in the range of 20 to 120 mm and preferably between 40 and 90 mm and a width of around 5 to 19 mm, preferably 11 mm.

The first plate (6) and the second plate (8) present baffles in the form of hemispherical protrusions (14), which protrude from the free surfaces of respectively the first plate (6) and/or the second plate (8) toward the corresponding free surface of the opposite plate. Said protrusions (14) can be an integral part of the plates (6, 8) or alternatively can be removably/releasably attached to the plates' surfaces through standard connecting means, such as for instance adhesive layers (not shown), or any suitable alternative (e.g. threaded, snap on, clamping, dowel pin connections). The protrusions (14) can have a diameter in a range of 0.5 to 3 mm and preferably of 1 to 2 mm. The height of said protrusions (14) is in the range of 0.25-1.5 mm and preferably between 0.5 and 1 mm. Alternative shapes of the baffles for instance may be a cone, prism, cuboid, or cylinder shape. The radial distance (not shown) between the centre of each protrusion (14) is in the range of 0.5 and 6.5 mm and the distance between the outer surface of each protrusion is between 0.1 to 3.5 mm. It will be appreciated that the distance between the outer surfaces of each protrusion may vary based on the shape and configuration of the protrusions. For example, when the protrusions are dome-shaped, the distance between the outer surfaces of two adjacent protrusions at the base of the dome will be less than the distances at the apex of the dome. Said protrusions (14) are distributed in a specific configuration in which these protrusions (14) are aligned to each other in both plates (6, 8) in a repeated pattern configuration (20) in the form of a matrix consisting of several rows and columns. The number of rows and columns of said repeated pattern configuration (20) is in the range of 2 to 30 rows and 2 to 15 columns. Alternative suitable configurations can be used, such as, for example, a random configuration or a labyrinthic configuration provided that said configurations on each plate matches the corresponding configuration on the opposite one, in such a way that when the two plates (6, 8) are combined/coupled to each other (working configuration, not shown) a ramified/branched fluid flow path is generated. The hemisphere protrusions (14) in this working configuration touch each other, generating said branched fluid flow path. In the embodiment shown in FIGS. 1 and 2, the hemispherical protrusions (14) of the first plate (6) are offset (and so not in register) with respect to the positions of the hemispherical protrusions (14) of the second plate (8) such that when the plates (6,8) are joined and the protrusions (14) brought close together, a winding and forking fluid flow path is created through the gaps between the protrusions. Said ramified/branched fluid flow path is a turbulence generating path.

Said protrusions (14) can be made of stainless steel or any other suitable metal and/or alternatively of polymeric material such as for example polypropylene (PP), polyethylene (PE), polyethylene terephthalate (PET), and/or polylactic acid (PLA), polyamide (PA), polycarbonate (PC) and/or a combination thereof. In alternative embodiments said protrusions (14) can consist of resilient material as for example rubber and/or silicon. The same substrates can be used to manufacture the plates themselves (6, 8).

The first plate (6) is retained in the first plate holder (2) and the second plate (8) is retained in the second plate holder (4) by means of standard retention means i.e. the threaded connection (22), but any alternative suitable retention means can be used, such as for instance snap-on, clamp-in, dowel pin and/or bayonetted connections. On said upper plate holder (2) and lower plate holder (4) is provided the sealing groove (12) to house the gasket (10), which ensures a tight sealing of the two plates (6, 8) when in working configuration, preventing fluid flow around the outside of the baffles, ensuring fluid flows through the branched conduit formed by the baffles (14) and ensuring a good foam quality. For each plate (6, 8) said groove (12) is formed into each plate holder (2, 4) surrounding the plate housing (16, 18) and the plate (6, 8) itself when the foaming device (1) is in the working (closed) configuration.

Said first plate holder (2) and second plate holder (4) can also consist of metal and/or plastic substrates, for example stainless steel and/or polypropylene (PP), polyethylene (PE), polyethylene terephthalate (PET), and/or polylactic acid (PLA), polyamide (PA), polycarbonate (PC) and/or a combination thereof.

The gasket (10) can be made of plastic material such as polypropylene (PP), polyethylene (PE), polyethylene terephthalate (PET), and/or polylactic acid (PLA), polyamide (PA), polycarbonate (PC) and/or a resilient material as for example rubber and/or silicone.

Referring now to FIG. 2, the partially assembled foaming device (1) of FIG. 1 is represented.

The first plate (6) and a second plate (8) are hosted inside the first plate housing (16) and a second plate housing (18), respectively. In the partially assembled form of the device (1), the gasket (10) is retained in the conduit or channel formed by the groove (12) positioned in the second plate (8). The protrusions (14) protrude from said plates (6, 8) towards each other. Connecting means in the form of pins (not shown) and corresponding receiving holes (26) ensure alignment between the two plates (6, 8) their connection during working configuration of a foaming device (1).

Alternative standard connecting means such as threaded, clip-on and/or snap-on connection can be used to secure the two plates (6, 8) to each other.

The protrusions on the plates surfaces are arranged such that the protrusions (14) on the first plate (6) and second plate (8) are offset laterally such that they create a branched fluid flow path between the two plates (6, 8) when the first plate (6) is close to (or abutting) the second plate (8) and sealed. The protrusions (14) on the two plates (6, 8) are not in register, to ensure the creation of such a turbulence generating path.

In use, the embodiment of FIG. 2 presents the two plates (6, 8) located inside respective plate holders (2, 4) which are connected to each other through a clamp/threaded connection (22). The gasket (10) is positioned within the channel formed by the grooves (12) to ensure a tight sealing and avoid any potential by-pass of a fluid (not shown). The two plates (6,8) and the gasket (10) therefore form a conduit which acts as a fluid flow path, and fluid entering this channel passes between and around the protrusions (14). The force exerted to keep together the two plates holder (2, 4) is in the range of 0.5 to 1.6 kN, preferably 0.8 kN (for a 9 bar back pressure). In this configuration, which going forward will be referred to as the "working configuration", the distance between the two plates (6, 8) is in the range between 1 and 2 mm and the volume of the cavity of the fluid conduit or channel defined between the two plates (6, 8) varies in between 150 and 1000 mm$^3$.

In use, the foaming device (1) in the working configuration can be placed in the fluid path of a beverage preparation apparatus and receive a fluid mixture in the form of a combination of a liquid beverage preparation (such as for example a coffee extract) and a gas (as for instance air). The liquid and gas flow rate ratio is in the range between 1:20 to 1:1.2.

Said fluid mixture reaches the fluid flow inlet (32) of the foaming device (1) and accesses the cavity of the fluid conduit formed between the two plates (6,8). Inside the cavity of the fluid conduit a turbulence generating path is defined by the protrusions (14) protruding from each plate (6, 8).

When the fluid mixture accesses the cavity of the conduit, it is pushed through said turbulence generating path which generates turbulence inside the fluid increasing fluid back pressure and consequently dissolution of the gas inside the fluid. A higher back pressure therefore improves gas solubility, increasing foam quality as a result.

In these conditions, the back pressure generated inside the foaming device (1) is up to 5.5 bar. The foaming device (1) acts as a flow restrictor, increasing the resistance to the fluid mixture passage and therefore increasing the back pressure. The fluid flow rate is in the range between 3 and 20 ml/sec, preferably 10 ml/sec.

The foam generation mechanism involves two phases a first turbulence generation phase and a second gas in liquid dissolution phase due to higher back pressure. This mechanism allows high-quality foam generation at a lower pressure than simple flow restricting orifices.

The protrusions (14) have a diameter in the range of range 0.65 to 2.0 mm, which provides a foam layer (crema) which mainly consists of microbubbles and appears to be thicker and last longer than the foam layer generated through small orifices, increasing the time of drainage (time to drain liquid from microbubbles' surfaces which causes the bubbles to burst) and therefore improving the crema stability.

Once the fluid mixture is foamed it is pushed out of the cavity of the fluid conduit through the fluid flow outlet (not shown) and sent to the cup for consumption via a state of the art fluid conduit system.

In preferred embodiments, the distance between the two plates (6, 8) can be varied throughout the beverage dispense cycle and/or the foaming step to better control foam quality or to create different foam densities and/or levels. In fact, the greater the distance between the two plates (6, 8), the larger are the diameters of the generated bubbles.

Furthermore, there is a direct correlation between the length of the turbulence generating path and the amount of foam exiting the foaming device (1). The longer the branched fluid flow path, the more foam is generated.

When the foaming device (1) is put in standby for a long period and/or needs to be cleaned before further beverage preparations, a cleaning procedure can be performed to improve hygiene of the foaming device (1) itself.

In the cleaning cycle, the two plates (6, 8) are separated from each other to reach an open position. This action can be carried out by acting on the threaded/clamp connection (22) to release the two plate holders (2, 4) and vary the distance between the first plate (6) and the second plate (8). A defined amount of water (not shown) in the range of 1 and 100 ml can be sent through the open plates via the fluid flow inlet (32) to flush the foaming device (1) and dislodge potential trapped particles (not shown).

The purge can also be performed by flushing with air instead of water.

In case of larger particles (with dimensions in the range of 2 mm or higher) trapped between the two plates (6, 8), multiple open/close cycles can be performed to help dislodging the particles from the foaming device (1).

In order to perform the working and/or cleaning cycles any suitable standard pump can be used, but a gear pump is preferred, which ensures highly efficient air dispersion.

For the manufacture of the two opposite plates (6, 8) an injection moulding process can be carried out, but any other alternative economic production technique can be also performed.

Several solutions for actuating the foaming device (1) can be considered to vary the distance between the two plates (6, 8) as shown in FIGS. 3a to 3f, which illustrate assemblies of the device (1) of FIGS. 1 and 2 with different attached plate opening and closing actuators. Among these solutions external pressures, electromechanical servo control and/or cam profiles.

Figure 3A:
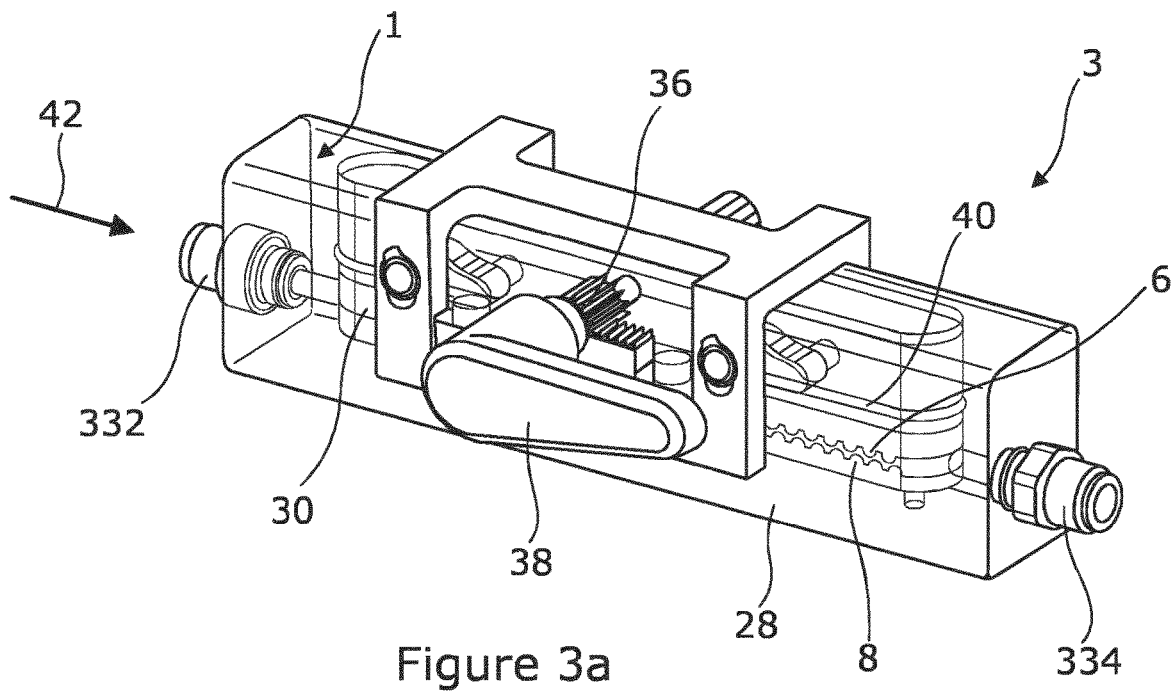
FIG. 3a illustrates a perspective view of an assembly of another embodiment of a foaming device of the first aspect of the invention, in an open configuration, according to the invention.

Referring to FIG. 3a, an assembly (3) of a foaming device (1) in an open configuration is shown.

In an assembly (3) of a foaming device (1) of FIGS. 1 and 2, a casing (28) houses the first plate (6) and a second plate (8) connected by means of standard connection means. A fluid conduit having a cavity (30) is generated by the connection of the two plates (6, 8). A fluid flow inlet (332) and a fluid flow outlet (334) are positioned at opposite ends of said casing (28) along a fluid flow direction (shown by arrow 42). A mechanism to vary the distance between the plates in the form of a rack and pinion mechanism (36) is connected to the two plates (6, 8) to allow variation of the distance between them and consequently variation of the height of the cavity (30) itself. The rack and pinion (36) is activated through an activation means in the form of a rotating handle (38). A supplementary seal (40) is provided to secured sealing of the casing (28).

By activating the rack and pinion mechanism (36) through the handle (38) the height (not shown) of said cavity (30) can vary in a range between 0.25 and 3 mm.

The rack and pinion mechanism allows the two plates (6, 8) to slide between an open configuration (in FIG. 3a) where distance between the two plates (6, 8) is higher to a closer, working configuration (in FIG. 3b) where the gap between the two plates (6, 8) is lower or absent and the cavity (30) has a reduced volume.

The cavity (30) volume can vary from 25 mm$^3$ to 6840 mm$^3$ with a height in the range of 0.25 to 3 mm, length in the range of 20 to 120 mm and width in the range of 5 to 19 mm.

Figure 3B:
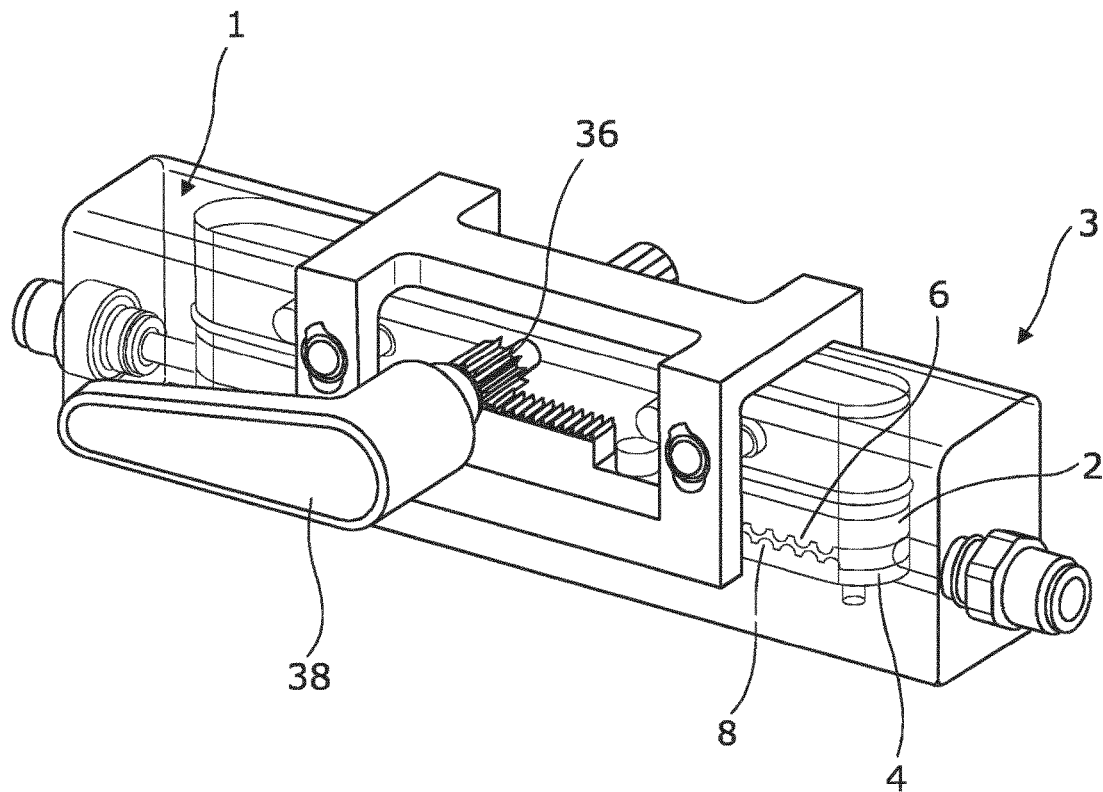
FIG. 3b illustrates a perspective view of the assembly of the foaming device of FIG. 3a in a working configuration, according to the invention.

Referring to FIG. 3b, in the working configuration shown in FIG. 3b the first plate holder (2) has been moved towards the second plate holder (4) to reach a working configuration position in which a fine foam (crema) can be generated. In the cavity (30) left between the two adjacent plates (6, 8) a turbulence generating path is created where the beverage is foamed.

Figure 3C:
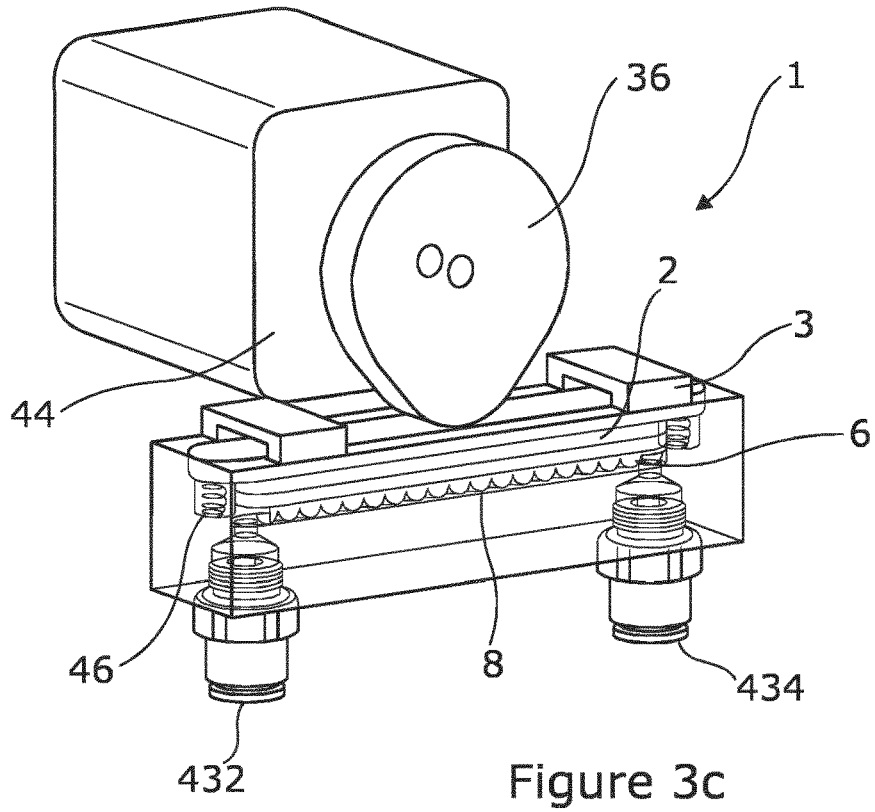
FIG. 3c illustrates a perspective view of a first alternative assembly of a foaming device of FIG. 3a, in a working configuration, according to the invention.

FIG. 3c illustrates a perspective view of an alternative assembly (3) of a foaming device (1) of FIG. 3b.

A first plate holder (2) is connected by standard connection means (not shown) to a first plate (6). A second plate (8) is formed into a second plate holder (4) in the form of a polymeric block having a slot cut therein, the bottom surface of the slot forming the second plate (8). The first plate holder (2) and first plate (6) are positioned directly above the second plate (8) and movable towards and away therefrom. The first plate holder (2) is attached to a mechanism to vary the distance between the first plate (6) and the second plate (8) in the form of a cam (36). An activating means in the form of a motor (44) is connected to said cam (36). A resilient means in the form on a spring (46) is directly connected to said first plate holder (2), to transfer the movement input form the cam (36) to the first plate holder (2). A fluid flow inlet (432) and a fluid flow outlet (434) are spaced apart from each other and positioned both on the same side of the second plate holder (4).

Note that in FIGS. 3b, 3c, 3d, 3e and 3f only protrusions projecting from the first plate (6) are visible as protrusions on the plates are not in register and therefore protrusions on the second plate (8) are hidden by those projecting from the first plate (6) when the plates are in a working configuration, as depicted in the Figures.

By rotating the cam (36) of FIG. 3c via said motor (44) a compression/distension movement of said spring (46) is performed, allowing the first plate holder (2) to move towards or away from the second plate (8), increasing or decreasing the distance between the two plates (6,8).

Figure 3D:
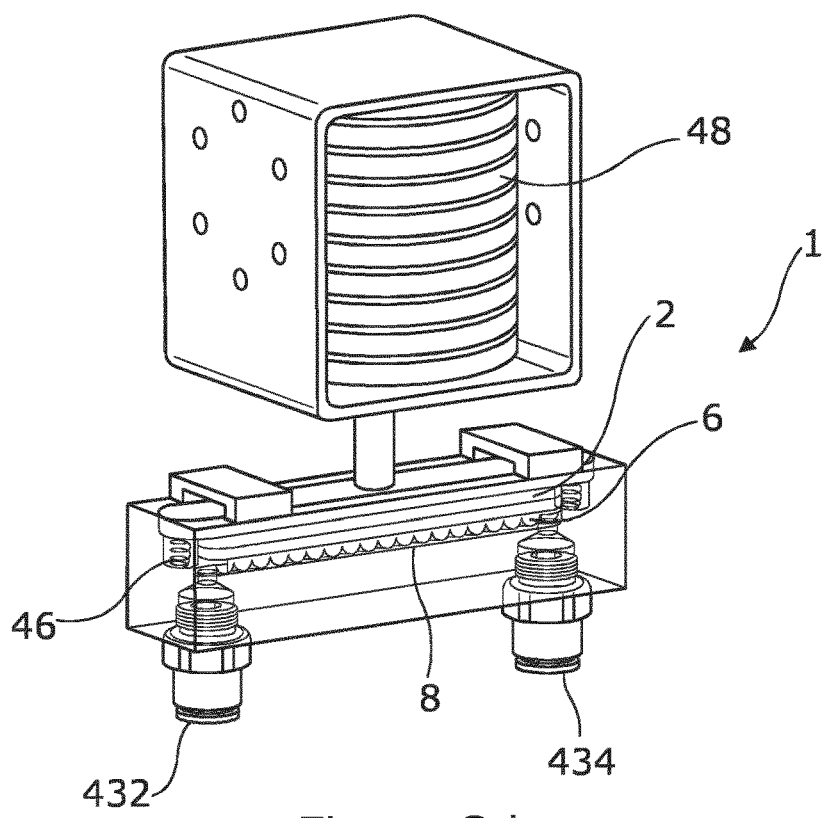
FIG. 3d illustrates a perspective view of a second alternative assembly of a foaming device of FIG. 3a, in a working configuration, according to the invention.

Referring now to FIG. 3d a second alternative of an assembly (3) of a foaming device (1) of FIG. 3a is shown.

The assembly of FIG. 3d is the same as that of FIG. 3c save that the cam mechanism (36) of FIG. 3a is replaced by a solenoid movement mechanism (36).

Figure 3E:
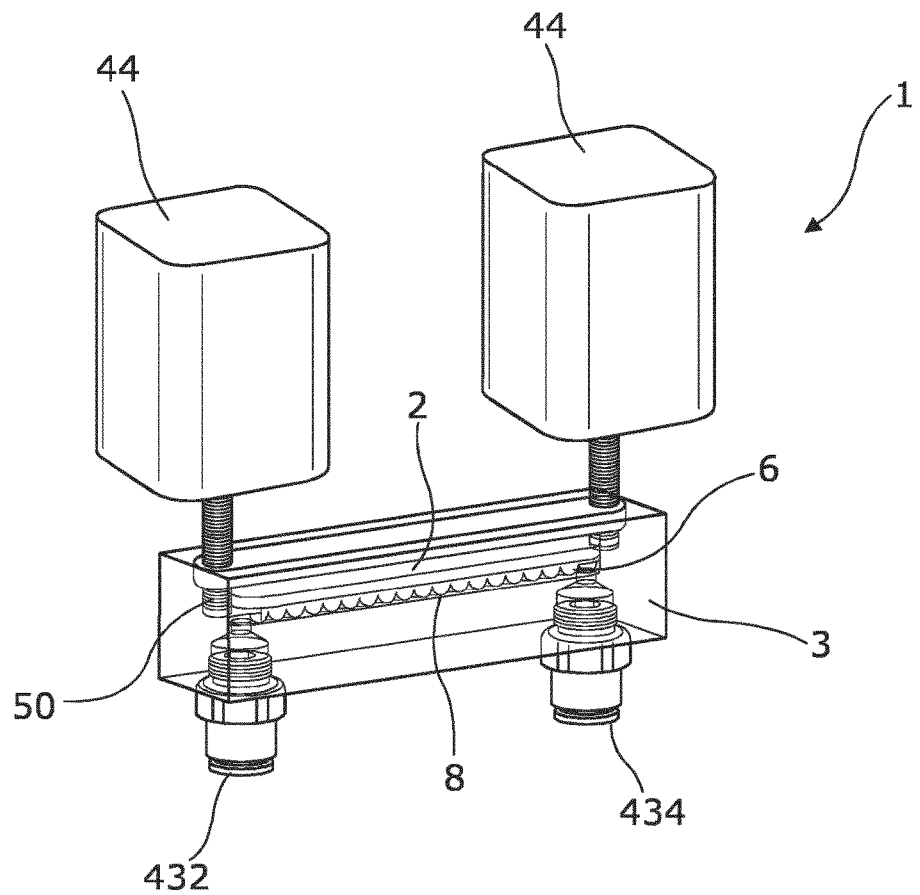
FIG. 3e illustrates a perspective view of a third alternative assembly of a foaming device of FIG. 3a, in a working configuration, according to the invention.

Referring to FIG. 3e a third alternative of an assembly (3) of a foaming device (1) of FIG. 3a is shown.

The assembly of FIG. 3e is the same as that of FIG. 3c save that the cam mechanism (36) of FIG. 3a is replaced by pistons (50).

Any alternative-mechanically actuator can be used to adjust distance between the two plates (6, 8) during working and/or cleaning cycles.

Figure 3F:
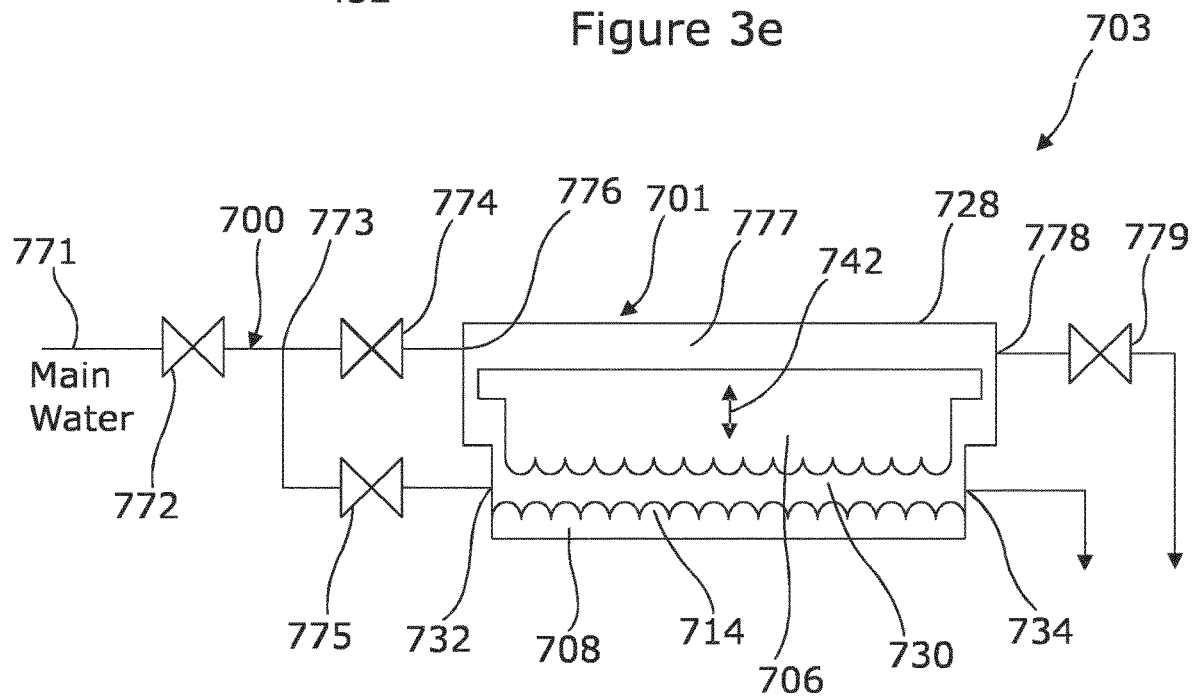
FIG. 3f illustrates a schematic a fourth alternative assembly of a foaming device of FIG. 3a, in an open configuration, according to the invention.

In the assembly (703) of FIG. 3f a schematic of a foaming device (701) which is hydraulically activated to adjust the distance between the two plates during working and/or cleaning cycles is shown.

Said foaming device (701) is connected to a main water source (not shown). The assembly (703) comprises three main components: a casing (728); a first plate integral with a plate holder (706) with hemispheric protrusions (714) projecting therefrom and a second plate (708) with hemispheric protrusions (714) projecting toward said first plate (706). A standard movement transfer means as for example the resilient means in the form on a spring (46) shown in FIGS. 3c and 3d is directly connected to the first plate (706), to transfer the hydraulic movement input directly to the first plate itself (706). Each of the casing (728), first plate (706), and second plate (708) are connected via a main water circuit (700). The fluid circuit includes a number of conduits and valves as follows. A water inlet (771) enters a main water valve (772); downstream of the main water valve (772) are a T junction pipe (773) which leads to a pressure chamber circuit valve (774) and a foaming device circuit valve (775); downstream of the pressure chamber circuit valve (774) is a pressure chamber flow inlet (776) which enters the pressure chamber (777); downstream of the pressure chamber (777) is a pressure chamber flow outlet (778) which enters a main water discharging valve (779); while downstream of the foaming device circuit valve (775) is a foaming device flow inlet (732) which enters the foaming cavity (730); downstream of the foaming cavity (730) is a foaming devise flow outlet (734). A beverage mixing/extraction chamber (not shown) is also operably connect to the foaming device (701) through the foaming device circuit valve (775).

Use of the assembly (703) of FIG. 3f will now be described. Firstly, when it is desired for water to pass through the main water circuit (700) the main water valve (772) is opened allowing flow downstream thereof, water enters the T junction (773) and consequently the pressure chamber (777) via the pressure chamber circuit valve (774) which is kept open, while the foaming device circuit valve (775) and the main water discharging valve (779) are kept closed. The pressure chamber (777) is then filled with water and the hydraulic pressure inside the pressure chamber (777) builds up exerting a hydraulic pressure on top of the first plate (706). A standard resilient means (i.e. a spring) allows the movement of said first plate (706) toward the opposite second plate (708), along the direction shown by arrow 742, varying the distance between the two plates (706, 708). When the two plates (706, 708) reach a working configuration distance to generate a fine foam from a beverage preparation, the main water valve (772) and the pressure chamber circuit valve (774) are then closed to maintain the first plate (706) in the position, while the foaming device circuit valve (775) is opened to allow the beverage (such as for instance coffee beverage and/or milk etc) to enter the cavity (730) left between the two plates (706, 708) in working configuration via the foaming device flow inlet (732) and pass through a branched/ramified path generated between the protrusions (714) on the two plates (706, 708), leading to the creation of fine foam. The foam is then sent for consumption through the foaming device flow outlet (734). When the foaming process is concluded and cleaning of the foaming device (701) is due, a cleaning cycle can be initiated. The main water discharging valve (779) is open to release the pressure inside the pressure chamber by discharging the water contained in the pressure chamber during working cycle. The main water valve (772) is opened and water is sent to the foaming device circuit valve (775), while the pressure chamber circuit valve (774) is kept closed. The water enters the cavity (730) through the foaming device flow inlet (732) and fills it. The water exerts a hydraulic pressure which pushes the two plates (706, 708) apart from each other allowing the water to clean the two opposite plates surfaces (not shown) and the protrusions (714) on both plates (706,708).

Figure 4:
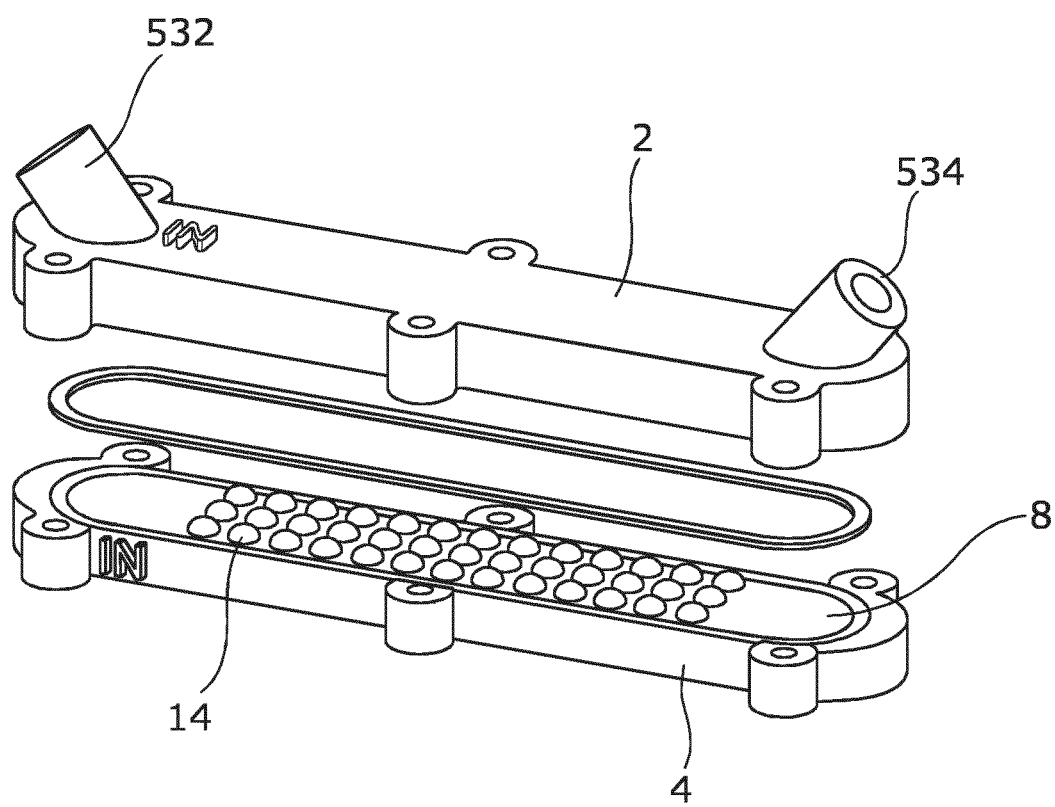
FIG. 4 illustrates a perspective exploded view of an alternative embodiment of the first aspect of the invention.

Referring now to FIG. 4, an alternative embodiment of a foaming device (1) is represented.

A first plate holder (2) and a second plate holder (4) are connected respectively to a first plate (not shown) and a second plate (8) by standard connecting means. Baffles in the form of hemispherical protrusions (14) are protruding from the second plate (8) towards the first plate. The first plate is planar and does not include protrusions. A fluid flow inlet (532) and a fluid flow outlet (534) are both positioned on the first plate holder (2), spaced apart from each other.

Alternatively, said fluid flow inlet (532) and fluid flow outlet (534) could both be positioned on the second plate holder (4).

In the embodiment shown in FIG. 4, the turbulence generating conduit is formed when the flat first plate abuts the protrusions (14) of the second plate, so that fluid is forced between and around the protrusions of the first plate (14).

Figure 5A:
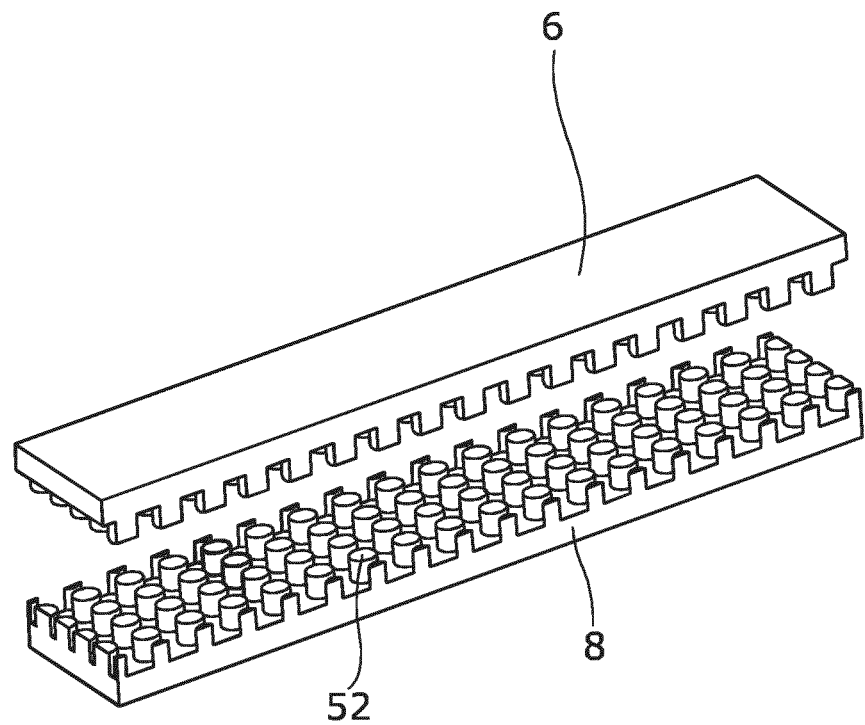
FIG. 5a illustrates a perspective view of an alternative embodiment of the plates of the first aspect of the invention, comprising baffles in the shape of cylinders, according to the invention.

With reference to FIG. 5*a* an alternative pair of plates (6,8) of an alternative embodiment of a foaming device, comprising a different shape of protrusions in the form of baffles is shown.

The first plate (6) and a second plate (8) of FIG. 5*a* comprise baffles in the form of cylindrical protrusions (52) protruding from each plate (6, 8) towards the opposite plate (6, 8).

The cylindrical protrusions' distribution on the plates' surfaces is such that it creates a turbulence generating path between the two plates (6, 8) when the first plate (6) is connected to the second plate (8) and sealed (as described above for the embodiment and FIGS. 1 and 2). The cylindrical protrusions' distributions on the two plates (6, 8) are not in register to ensure the creation of such a turbulence generating path.

Any alternative suitable baffle shape and material can be used for the two plates (6, 8) as discussed for FIG. 1.

Figure 5B:
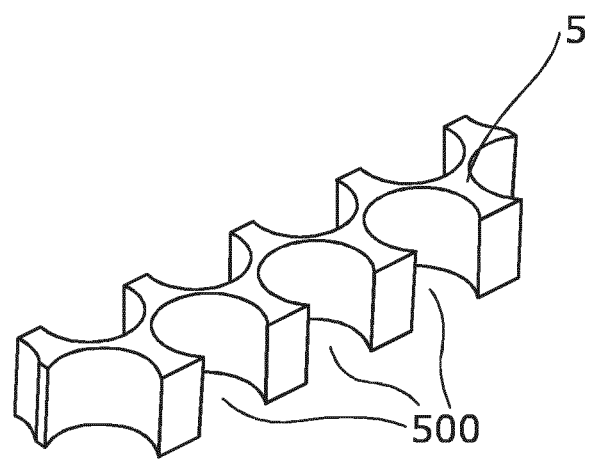
FIG. 5b illustrates a perspective view of an empty space left between baffles in the shape of cylinders, of the embodiment of FIG. 5a, according to the invention.

FIG. 5*b* represents a portion of a fluid turbulence generating conduit (5) formed between the two sets of protrusions (52) of the first and second plates (6,8) of FIG. 5*a*, when the plates (6,8) are brought together to the working position/configuration. Note the conduit (5) in FIG. 5*b* is shown as a solid negative of the conduit formed by the baffles (52) of FIG. 5*a*. Spaces (500) correspond to where the protrusions (52) are located.

As the two sets of protrusions (52) are off-set and not in register, they form a fluid turbulence generating conduit (5) between said plates (6, 8) when the plates are in a working configuration as part of a foaming device.

Figure 6A:
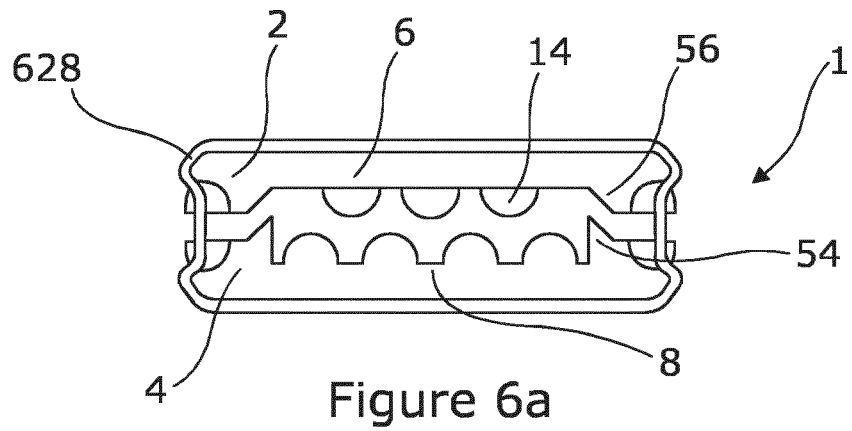
FIG. 6a illustrates a cross sectional view of an alternative embodiment of the first aspect of the invention, in an open configuration, comprising a resilient casing, according the invention.

Referring now to FIG. 6*a*, an end cross-sectional view of an alternative embodiment of a foaming device (1) comprising a casing in the form of a resilient sleeve (628) is shown, in an open (e.g. cleaning) configuration.

A first plate (6) and a second plate (8) are connected to a first plate holder (2) and a second plate holder (4) which are integral to respectively the first plate (6) and the second plate (8). A side seal in the form of a protruding rim (54) extends along the sides of the second plate (6), matching a counterpart rim (56) located on the second plate (8). When the plates (2,4) are in the closed, working configuration, the two rims (54, 56) mate and form a seal therebetween, thereby forming the sides of the fluid conduit. Baffles in the form of hemispherical protrusions (14) protrude from each plate towards the opposite one and the baffles on the plates (6, 8) are not in register, in order to create a turbulence generating path between said protrusions (14) when the foaming device (1) is in the working configuration.

The first and second plate holders (2,4) are housed in a casing in the form of a resilient sleeve (628). Said sleeve (628) is made of an elastomeric substrate such as rubber, silicone and/or alternatively of plastic substrate for instance polypropylene (PP), polyethylene (PE), polyethylene terephthalate (PET), and/or polylactic acid (PLA), polyamide (PA), polycarbonate (PC) and/or a combination thereof.

The presence of the rim (54) overcomes the necessity of having sealing tight means such as a gasket, reducing the complexity of the foaming device (1) and manufacturing costs. Furthermore, a simplified structure with fewer pieces will ensure easier cleaning, reducing clogging and device failure.

The plate holders (2, 4) can be co-moulded together with the respective plates (6, 8), but any alternative suitable solution to connect the plate holders (2, 4) to the plates (6, 8), as described for instance for the embodiment of FIG. 1, may be used.

Figure 6B:
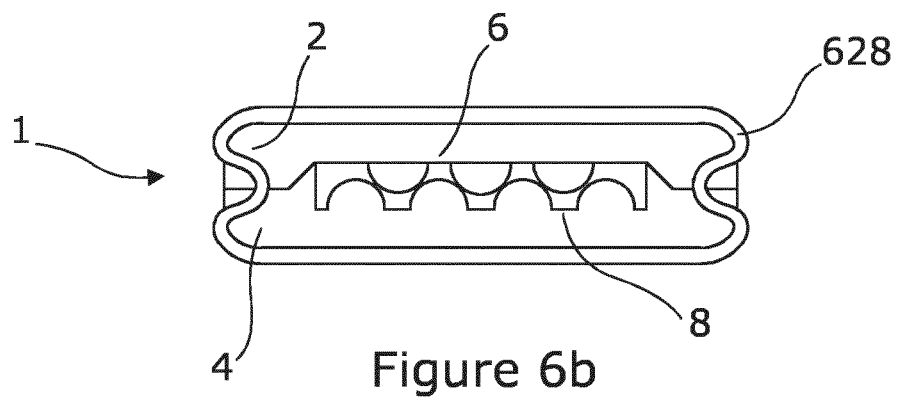
FIG. 6b illustrates a cross sectional view of the embodiment of FIG. 6a in a working configuration, according the invention.

Referring now to FIG. 6*b* the foaming device (1) of FIG. 6*a* in a closed, working configuration is represented.

Said sleeve (628) is made of resilient material, and by action of an external force (such as one of the mechanisms of FIGS. 3*a*-3*f,* for example) it can flex and contract, which allows the two plate holders (2, 4) to move closer together, forming the working configuration, as shown in FIG. 6*b* and then to separate from each other (as shown in FIG. 6*a*), increasing the distance between the two plates (6, 8) which facilitates cleaning cycles where water can be sent through the foaming device (1) when the two plates (6, 8) are separated from each other.

Similarly to FIGS. 6a and 6b, alternative embodiments of a foaming device (1) comprising a casing device in the form of a rigid plastic cuff (628) can be used. Said cuff can be made of any suitable plastic material such as for example polypropylene (PP), polyethylene (PE), polyethylene terephthalate (PET), and/or polylactic acid (PLA), polyamide (PA), polycarbonate (PC) and/or a combination thereof.

Figure 7A:
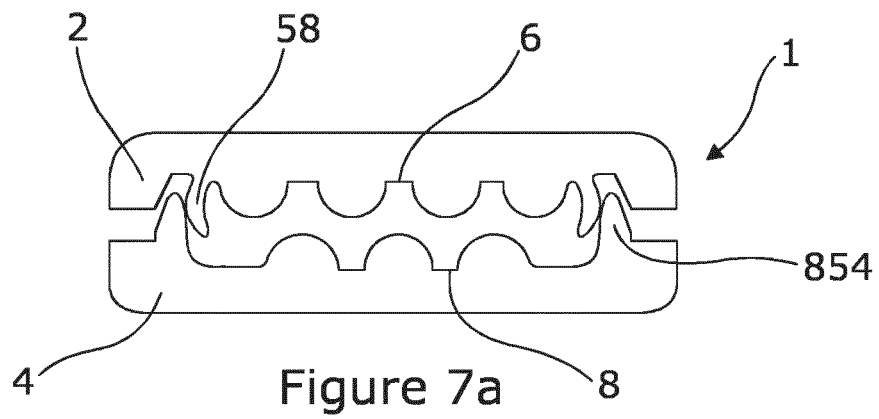
FIG. 7a illustrates a cross sectional view of an alternative embodiment of the first aspect of the invention, comprising a lateral engagement sealing means, in open configuration, according the first aspect of the invention.
Figure 7B:
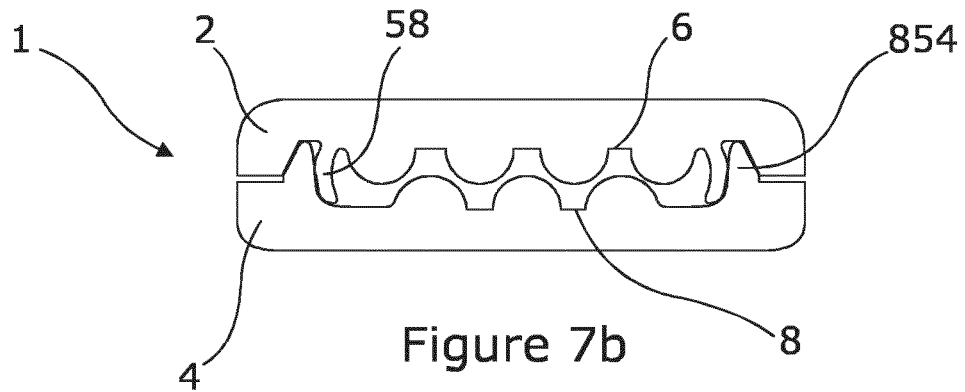
FIG. 7b illustrates a cross sectional view of the embodiment of FIG. 7a in a working configuration according the invention.

Referring to FIGS. 7a and 7b a device similar to the one shown in FIGS. 6a and 6b is shown, save that the resilient casing is absent and the flanges (58, 854) serve to solely seal the sides and create the side walls of the conduit formed between the two plates (6, 8).

Figure 8A:
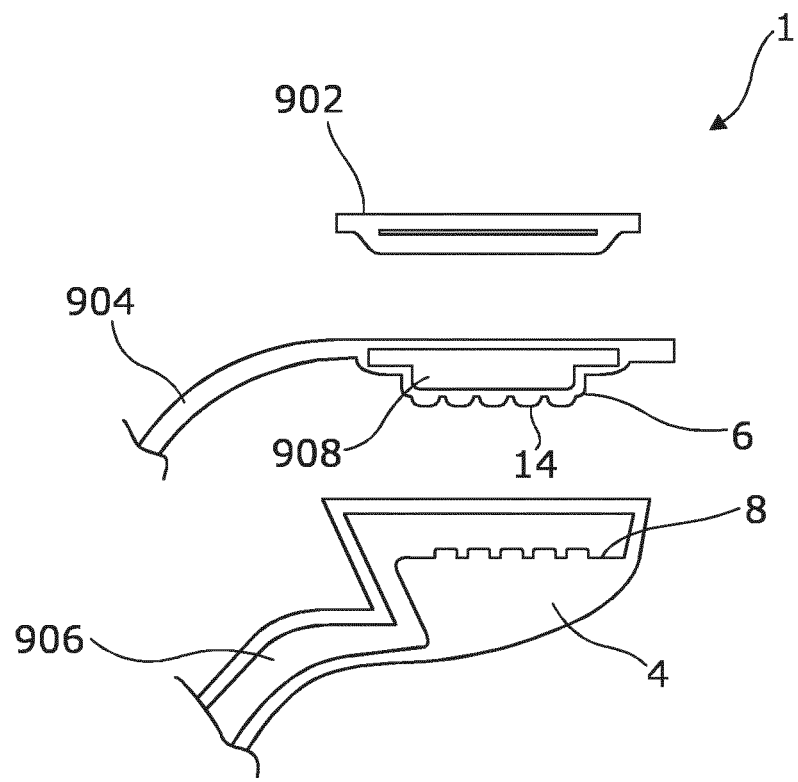
FIG. 8a illustrates a cross sectional exploded view of an alternative embodiment of the first aspect of the invention, comprising a coffee pod, a pod holder and a spout, according the invention.
Figure 8B:
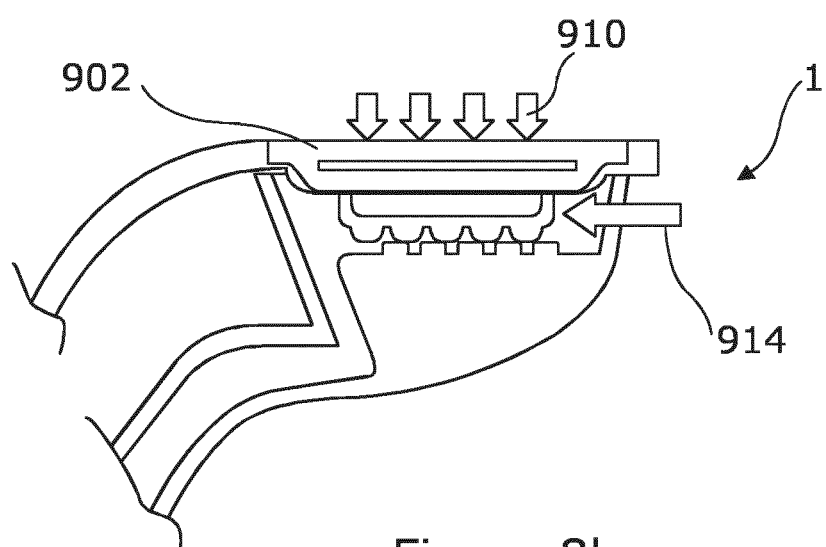
FIG. 8b illustrates a cross sectional view of the embodiment of FIG. 8a in a working configuration, according the first aspect of the invention.

FIGS. 8a and 8b show cross-sectional views of an alternative embodiment of a foaming device (1) combined with part of a coffee preparation apparatus.

A first plate (6) is located in a pod holder (904) on a lowermost surface (908) of said pod holder (904) The pod holder therefore acts as a first plate holder. A coffee pod (902) can be placed into the pod holder (904) as shown in FIG. 8b. A second plate holder (4) with integral second plate (8) is located in a spout (906) of a coffee preparation apparatus outlet, in such a way to be in register with said first plate (6) when said pod holder (904) is inserted into said spout (906). Baffles in the form of hemispherical protrusions (14) protrude from each plate (6, 8) towards the opposite plate (6, 8), to generate a turbulence generating path.

FIG. 8a shows the two parts, pod holder (904) and spout (906) separated such that the first and second plates (6,8) are in the open (e.g. cleaning) configuration, and without an attached coffee pod (902) in the pod holder (904).

FIG. 8b shows the pod holder 904 and spout (906) connected, such that the two plates (6,8) abut and the protrusions (14) form a fluid conduit therebetween.

In a working configuration, as shown in FIG. 8b, a liquid inlet (not shown) provides a water flow (910) through the coffee pod (902) and a gas inlet (not shown) is provided with a gas flow (914) and is positioned laterally with respect to said water flow (910).

In use of the apparatus of FIGS. 8a and 8b, the water flow (910) passing through the coffee pod (902) extracts coffee brew which then reaches the lowermost surface (908) of said pod holder (904) mixing with the gas flow (914) coming from the gas inlet (912).

The mix of coffee brew and gas then passes through the turbulence generating conduit between the plates (6,8) to generate a foamed beverage.

Example 1 (of the Invention)

Figure 9:
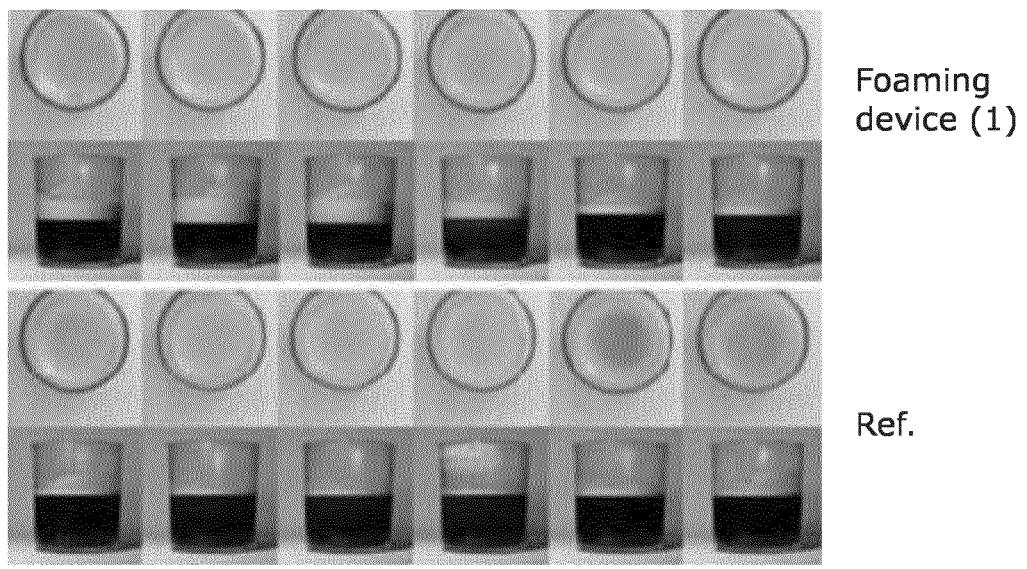
FIG. 9 illustrates a comparison between a coffee beverage foaming performance of an embodiment of the first aspect of the invention and a foamer of the prior art provided with restrictor, according to the invention.
Figure 11:
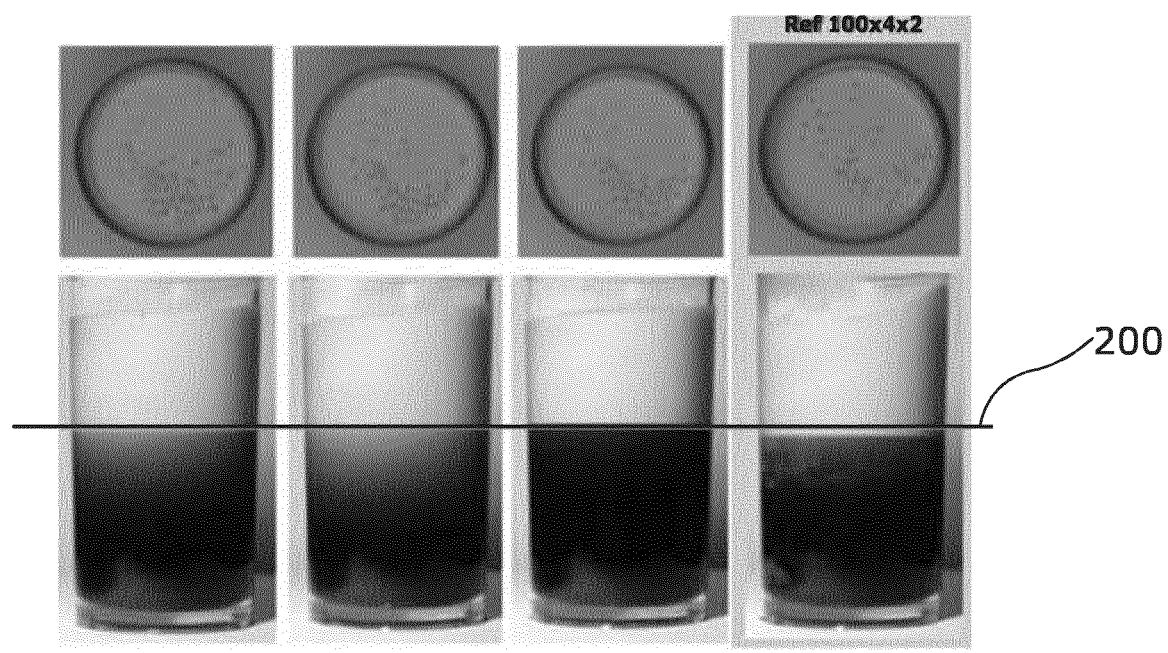
FIG. 11 illustrates a comparison between a coffee beverage foaming performance of an embodiment of the first aspect of the invention and a bead-in-tube foamer of the prior art, according to the invention.

Foaming Device (1) and Experimental Conditions Set Up:
Foaming device (1)—as described for FIGS. 3a and 3b
Hemispherical protrusion diameter 2 mm;
Plate width 11 mm;
Plate length 60 mm;
Food beverage: coffee preparation
Back Pressure generated: ~5.3 bar
Reference Foamer: restrictor 0.8 diameter x 8 mm length
Coffee preparation flow rate ~9.4 ml/s FIG. 9 shows a comparison between a coffee foam generated through a foamer of the prior art provided with a restrictor (labelled "Ref") and a foaming device (1) of FIG. 3a and 3b.FIG. 11 shows the results of foaming of a coffee beverage over 6 repeats of the experimental conditions, showing foam height differences between the foam produced using the device (1) of the invention and that of the reference foamer of the prior art.

An improved performance in term of quality and quantity of foam for the foaming device (1) compared to the reference (restrictor) foamer is noticeable.

Example 2 (of the Invention)

Foaming Device (1) and Experimental Conditions Set Up:
Foaming device (1)—as described for FIGS. 3a and 3b
Hemispherical protrusions diameter 3 mm;
Plate width 16 mm;
Plate length 100 mm;
Food beverage: milk
Back Pressure generated: 5.5 bar
Reference Foamer: bead-in-tube (length 100 mm, tube diameter 4 mm, beads diameter 2 mm)
Air flow rate ~0.3 ml/s,
Milk flow rate ~10 ml/s
In-cup temperature ~60° C.

Figure 10:
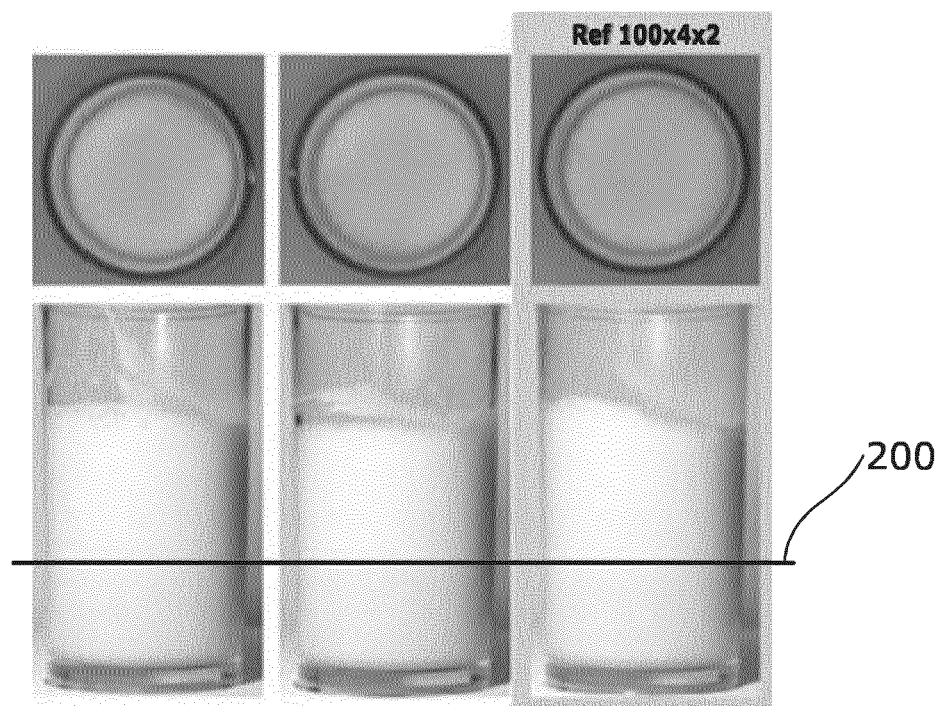
FIG. 10 illustrates a comparison between a milk foaming performance of an embodiment of the first aspect of the invention and a bead-in-tube foamer of the prior art, according to the invention.

FIG. 10 shows a comparison between milk foam generated through a foamer of the prior art (in the column labelled Ref 100×4×2) provided with bead-in-tube and a foaming device (1) of the invention (the first two unlabelled columns).

A height level line (200) highlights the interphase between foam and liquid.

It is evident from FIG. 10 that the performance of the foaming device (1) of the invention is comparable to the reference (bead-in-tube) foamer. It should be noted that the devices (1) of the invention which produce foam of a comparable quality to those produced using prior art foamers, have the extra benefits or easy cleaning, unclogging and variable foam quantity and bubble size capabilities (due to the ability to move the plates of the devices (1) of the invention further and nearer to each other).

Example 3 (of the Invention)

Foaming Device (1) and Experimental Conditions Set Up:
Foaming device (1)—as described for FIGS. 3a and 3b
Triangular prism protrusions:
dimension 3 mm;
Plates width 13 mm;
Plates length 60 mm;
Food beverage coffee beverage
Back Pressure generated: 5.5 bar
Reference Foamer: bead-in-tube (length 100 mm, tube diameter 4 mm, beads diameter 2 mm)
Air flow rate ~0.4 ml/s,
Coffee beverage flow rate ~10 ml/s
In-cup temperature ~63-67° C.

FIG. 11 shows a comparison between coffee foam generated through a foamer of the prior art comprising a bead-in-tube foamer (the reference images are in the column labelled Ref 100×4×2) and a foamer device of the invention (the images of the first three columns of FIG. 11).

A height level line (200) highlight the interphase between foam and liquid.

The performances of the foaming device of the invention and the reference (bead-in-tube) foamer are comparable.

The above embodiments are described by way of example only. Many variations are possible without departing from the scope of the invention as defined in the appended claims.

The invention claimed is:
1. A foaming device for use in combination with a beverage preparation apparatus, the foaming device comprising:
a fluid inlet a fluid outlet spaced apart from said fluid inlet and a fluid conduit extending from said fluid inlet to said fluid outlet, the fluid conduit defining a cavity wherein said fluid conduit comprises first and second plates at least one of which comprises a plurality of baffles projecting into the cavity of the fluid conduit, and wherein at least one of said plates is movable with respect to the other to vary the distance between said plates, and wherein the baffles are configured such that they form a fluid flow path which changes in cross-sectional area along the path, and wherein the cross-sectional area of the baffles changes along the length (height) of the baffles, such that the cross-sectional area of the path between the baffles also changes in area along the full path formed between the baffles.

2. A foaming device according to claim 1 wherein only one of said plates is movable with respect to the other.

3. A foaming device according to claim 1 wherein said first plate and said second plate are both movable.

4. A foaming device according to claim 1 wherein said first plate and said second plate are detachably connected.

5. A foaming device according to claim 1 wherein said first and second plates are connected to a first and second plate holder respectively.

6. A foaming device according to claim 5 wherein said first and second plate holders comprise a seal which is arranged in use to seal the periphery of said first and second plates or plate holders.

7. A foaming device according to claim 6 wherein said seal comprises a resilient seal.

8. A foaming device according to claim 7 wherein said resilient seal comprises a rubber and/or plastic seal.

9. A foaming device according to claim 8 wherein said rubber and/or plastic seal comprises a gasket.

10. A foaming device according to claim 7 wherein said seal is located in a seal housing provided on said first and second plate holders.

11. A foaming device according to claim 1 wherein both of said first and second plates comprise said plurality of baffles projecting into said cavity.

12. A foaming device according to claim 1 wherein said plurality of baffles extend along at least a majority of the length of at least one of said plates.

13. A foaming device according to claim 1 wherein said plurality of baffles extend along at least a portion of said first and second plates and at least a portion of said plurality of baffles on said first and second plates are not in register.

14. A foaming device according to claim 1 wherein said plurality of baffles are positioned along said first plate and/or said second plate in a repeated pattern configuration.

15. A foaming device according to claim 1 wherein said first and second plates are movable with respect to each other within a range of 0.5 and 5.5 mm.

16. A foaming device according to claim 1 wherein said first and second plates are movable between a non-operational position to an operational position in which said plurality of baffles projecting from said first plate and/or said second plate create a turbulence-generating fluid flow path within said cavity of said fluid conduit.

17. A foaming device according to claim 16 wherein said fluid flow path within said cavity is generated when the distance between said first and second plates is in the range of 0.5-4.5 mm.

18. A foaming device according to claim 1 wherein fluid flow through the fluid conduit is configured to between 1 and 40 ml/sec, in use.

19. A beverage preparation apparatus comprising a foaming device as claimed in claim 1.

20. A beverage preparation apparatus according to claim 19 wherein one of said first and second plates comprises a beverage container holder.

21. A beverage preparation apparatus according to claim 20 wherein one of said first and second plates comprises a beverage dispensing orifice.

22. A method of foaming a liquid using the foaming device as claimed in claim 1, comprising the steps of:
 a. providing at least a liquid and at least a gas;
 b. conveying said liquid and said gas through the fluid conduit to create a foamed fluid; and
 c. collecting the foamed fluid.

23. A method of foaming a liquid according to claim 22 wherein said step b) comprises arranging said first and second plates such that the plurality of baffles form a turbulence-generating fluid flow path.

24. A method of cleaning a foaming device as claimed in claim 1, comprising the steps of:
 a. increasing the distance between said first and second plates; and
 b. conveying at least one of a flushing/purging liquid or a gas through the fluid conduit formed between said plates.

* * * * *